United States Patent
Mayya et al.

(10) Patent No.: US 10,454,714 B2
(45) Date of Patent: Oct. 22, 2019

(54) METHOD AND SYSTEM OF OVERLAY FLOW CONTROL

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US); Vipin Kumar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 98 days.

(21) Appl. No.: 15/624,532

(22) Filed: Jun. 15, 2017

(65) Prior Publication Data
US 2018/0034668 A1 Feb. 1, 2018

Related U.S. Application Data

(63) Continuation-in-part of application No. 14/321,818, filed on Jul. 2, 2014, now Pat. No. 9,722,815.
(Continued)

(51) Int. Cl.
*H04L 12/66* (2006.01)
*H04L 29/08* (2006.01)
(Continued)

(52) U.S. Cl.
CPC .......... *H04L 12/66* (2013.01); *H04L 41/5041* (2013.01); *H04L 41/5096* (2013.01);
(Continued)

(58) Field of Classification Search
None
See application file for complete search history.

(56) References Cited

U.S. PATENT DOCUMENTS 7,003,481 B2  2/2006 Banka et al.
8,111,692 B2  2/2012 Ray
(Continued)

FOREIGN PATENT DOCUMENTS

EP  1912381 A1  4/2008
EP  3041178 A1  7/2016
(Continued)

OTHER PUBLICATIONS

Non-Published commonly Owned U.S. Appl. No. 15/701,115, filed Sep. 11, 2017, 21 pages, Nicira, Inc.
(Continued)

*Primary Examiner* — Saumit Shah
(74) *Attorney, Agent, or Firm* — Adeli LLP

(57) ABSTRACT

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

20 Claims, 13 Drawing Sheets

Related U.S. Application Data

(60) Provisional application No. 62/457,816, filed on Feb. 11, 2017, provisional application No. 61/844,822, filed on Jul. 10, 2013.

(51) Int. Cl.
| | |
|---|---|
| *H04L 12/851* | (2013.01) |
| *H04L 12/24* | (2006.01) |
| *H04L 12/26* | (2006.01) |
| *H04L 12/751* | (2013.01) |
| *H04L 12/715* | (2013.01) |
| *H04L 12/723* | (2013.01) |
| *H04L 12/46* | (2006.01) |

(52) U.S. Cl.
CPC .......... *H04L 43/0894* (2013.01); *H04L 45/02* (2013.01); *H04L 45/04* (2013.01); *H04L 47/24* (2013.01); *H04L 69/325* (2013.01); *H04L 45/50* (2013.01); *H04L 2012/4629* (2013.01)

(56) References Cited

U.S. PATENT DOCUMENTS

| | | | |
|---|---|---|---|
| 8,228,928 B2 | 7/2012 | Parandekar et al. | |
| 8,243,589 B1 | 8/2012 | Trost et al. | |
| 8,566,452 B1 | 10/2013 | Goodwin, III et al. | |
| 8,724,456 B1 | 5/2014 | Hong et al. | |
| 8,964,548 B1 | 2/2015 | Keralapura et al. | |
| 9,071,607 B2 | 6/2015 | Twitchell, Jr. | |
| 9,154,327 B1 | 10/2015 | Marino et al. | |
| 9,306,949 B1 | 4/2016 | Richard et al. | |
| 9,336,040 B2 | 5/2016 | Dong et al. | |
| 9,354,983 B1 | 5/2016 | Yenamandra et al. | |
| 9,432,245 B1 | 8/2016 | Sorenson et al. | |
| 9,450,817 B1 | 9/2016 | Bahadur et al. | |
| 9,525,564 B2 | 12/2016 | Lee | |
| 9,715,401 B2 | 7/2017 | Devine et al. | |
| 9,722,815 B2 | 8/2017 | Mukundan et al. | |
| 9,787,559 B1 | 10/2017 | Schroeder | |
| 10,135,789 B2 | 11/2018 | Mayya et al. | |
| 10,178,032 B1 | 1/2019 | Freitas | |
| 10,187,289 B1 | 1/2019 | Chen et al. | |
| 10,229,017 B1 | 3/2019 | Zou et al. | |
| 10,326,830 B1 | 6/2019 | Singh | |
| 2002/0198840 A1 | 12/2002 | Banka et al. | |
| 2003/0112808 A1 | 6/2003 | Solomon | |
| 2003/0161313 A1 | 8/2003 | Jinmei et al. | |
| 2003/0202506 A1 | 10/2003 | Perkins et al. | |
| 2003/0219030 A1 | 11/2003 | Gubbi | |
| 2004/0059831 A1 | 3/2004 | Chu et al. | |
| 2004/0068668 A1 | 4/2004 | Lor et al. | |
| 2005/0078690 A1 | 4/2005 | DeLangis | |
| 2006/0114838 A1 | 6/2006 | Mandavilli et al. | |
| 2006/0171365 A1 | 8/2006 | Borella | |
| 2006/0182034 A1 | 8/2006 | Klinker et al. | |
| 2006/0193247 A1* | 8/2006 | Naseh ..................... H04L 45/04 370/216 | |
| 2007/0091794 A1 | 4/2007 | Filsfils et al. | |
| 2007/0121486 A1 | 5/2007 | Guichard et al. | |
| 2007/0177511 A1 | 8/2007 | Das et al. | |
| 2007/0260746 A1 | 11/2007 | Mirtorabi et al. | |
| 2008/0049621 A1 | 2/2008 | McGuire et al. | |
| 2008/0080509 A1 | 4/2008 | Khanna et al. | |
| 2008/0219276 A1 | 9/2008 | Shah et al. | |
| 2009/0154463 A1 | 6/2009 | Hines et al. | |
| 2010/0008361 A1 | 1/2010 | Guichard et al. | |
| 2010/0332657 A1 | 12/2010 | Elyashev et al. | |
| 2011/0075674 A1 | 3/2011 | Li et al. | |
| 2011/0110370 A1 | 5/2011 | Moreno et al. | |
| 2011/0153909 A1 | 6/2011 | Dong | |
| 2012/0008630 A1 | 1/2012 | Ould-Brahim | |
| 2012/0157068 A1 | 6/2012 | Eichen et al. | |
| 2012/0221955 A1 | 8/2012 | Raleigh et al. | |
| 2012/0250682 A1 | 10/2012 | Vincent et al. | |
| 2012/0250686 A1 | 10/2012 | Vincent et al. | |
| 2012/0300615 A1 | 11/2012 | Kempf et al. | |
| 2013/0019005 A1 | 1/2013 | Hui et al. | |
| 2013/0021968 A1 | 1/2013 | Reznik et al. | |
| 2013/0044764 A1 | 2/2013 | Casado et al. | |
| 2013/0051399 A1 | 2/2013 | Zhang et al. | |
| 2013/0128889 A1 | 5/2013 | Mathur et al. | |
| 2013/0173788 A1 | 7/2013 | Song | |
| 2013/0238782 A1 | 9/2013 | Zhao et al. | |
| 2013/0258839 A1* | 10/2013 | Wang .................. H04L 41/0668 370/221 |
| 2013/0283364 A1 | 10/2013 | Chang et al. | |
| 2013/0329548 A1 | 12/2013 | Nakil et al. | |
| 2014/0019604 A1 | 1/2014 | Twitchell, Jr. | |
| 2014/0156823 A1 | 6/2014 | Liu et al. | |
| 2014/0219135 A1 | 8/2014 | Li et al. | |
| 2014/0223507 A1 | 8/2014 | Xu | |
| 2014/0244851 A1 | 8/2014 | Lee | |
| 2015/0016249 A1 | 1/2015 | Mukundan et al. | |
| 2015/0188823 A1 | 7/2015 | Williams et al. | |
| 2015/0334696 A1 | 11/2015 | Gu et al. | |
| 2015/0363733 A1 | 12/2015 | Brown | |
| 2016/0072669 A1 | 3/2016 | Saavedra | |
| 2016/0142373 A1 | 5/2016 | Ossipov | |
| 2016/0164914 A1 | 6/2016 | Madhav et al. | |
| 2016/0210209 A1 | 7/2016 | Verkaik et al. | |
| 2016/0218947 A1 | 7/2016 | Hughes et al. | |
| 2016/0315912 A1 | 10/2016 | Mayya et al. | |
| 2016/0359738 A1 | 12/2016 | Sullenberger et al. | |
| 2017/0012870 A1 | 1/2017 | Blair et al. | |
| 2017/0034129 A1 | 2/2017 | Sawant et al. | |
| 2017/0053258 A1 | 2/2017 | Carney et al. | |
| 2017/0055131 A1 | 2/2017 | Kong et al. | |
| 2017/0064005 A1 | 3/2017 | Lee | |
| 2017/0126564 A1 | 5/2017 | Mayya et al. | |
| 2017/0134186 A1 | 5/2017 | Mukundan et al. | |
| 2017/0201585 A1 | 7/2017 | Doraiswamy et al. | |
| 2017/0214701 A1 | 7/2017 | Hasan | |
| 2017/0237710 A1 | 8/2017 | Mayya et al. | |
| 2017/0279717 A1* | 9/2017 | Bethers .................. H04L 45/748 |
| 2017/0310691 A1 | 10/2017 | Vasseur et al. | |
| 2017/0339070 A1 | 11/2017 | Chang et al. | |
| 2018/0234300 A1 | 8/2018 | Mayya et al. | |
| 2018/0270104 A1* | 9/2018 | Zheng .................. H04L 41/082 |
| 2018/0302286 A1 | 10/2018 | Mayya et al. | |
| 2018/0375744 A1 | 12/2018 | Mayya et al. | |
| 2018/0375824 A1 | 12/2018 | Mayya et al. | |
| 2019/0075083 A1 | 3/2019 | Mayya et al. | |
| 2019/0103990 A1 | 4/2019 | Cidon et al. | |
| 2019/0103991 A1 | 4/2019 | Cidon et al. | |
| 2019/0103992 A1 | 4/2019 | Cidon et al. | |
| 2019/0103993 A1 | 4/2019 | Cidon et al. | |
| 2019/0104035 A1 | 4/2019 | Cidon et al. | |
| 2019/0104049 A1 | 4/2019 | Cidon et al. | |
| 2019/0104050 A1 | 4/2019 | Cidon et al. | |
| 2019/0104051 A1 | 4/2019 | Cidon et al. | |
| 2019/0104052 A1 | 4/2019 | Cidon et al. | |
| 2019/0104053 A1 | 4/2019 | Cidon et al. | |
| 2019/0104063 A1 | 4/2019 | Cidon et al. | |
| 2019/0104064 A1 | 4/2019 | Cidon et al. | |
| 2019/0104109 A1 | 4/2019 | Cidon et al. | |
| 2019/0104111 A1 | 4/2019 | Cidon et al. | |
| 2019/0104413 A1 | 4/2019 | Cidon et al. | |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |

OTHER PUBLICATIONS

Non-Published commonly Owned U.S. Appl. No. 15/707,124, filed Sep. 18, 2017, 24 pages, Nicira, Inc.
Non-Published commonly Owned U.S. Appl. No. 15/784,404, filed Oct. 16, 2017, 21 pages, Nicira, Inc.
Non-Published commonly Owned U.S. Appl. No. 15/811,329, filed Nov. 13, 2017, 37 pages, Nicira, Inc.

(56) References Cited

OTHER PUBLICATIONS

Non-Published commonly Owned U.S. Appl. No. 15/838,052, filed Dec. 11, 2017, 28 pages, Nicira, Inc.
Non-Published commonly Owned U.S. Appl. No. 15/838,355, filed Dec. 11, 2017, 29 pages, Nicira, Inc.
Petition for Post-Grant Review of U.S. Pat. No. 9,722,815, filed May 1, 2018, 106 pages.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

* cited by examiner

METHOD AND SYSTEM OF OVERLAY FLOW CONTROL

CROSS-REFERENCE TO RELATED APPLICATIONS

This application claims priority to U.S. Provisional Application No. 62/457,816, titled METHOD AND SYSTEM OF OVERLAY FLOW CONTROL, filed on 11 Feb. 2017. This provisional application is incorporated by reference in its entirety. This application also claims priority to U.S. patent application Ser. No. 14/321,818, titled EDGE-GATEWAY MULTIPATH METHOD AND SYSTEM, filed on Jul. 2, 2014, and now issued as U.S. Pat. No. 9,722,815. This application is incorporated by reference in its entirety.

FIELD OF THE INVENTION

This application relates generally to computer networking, and more specifically to a system, article of manufacture and method of establishing and managing overlay flow control in a computer network.

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs can be setup one at a time and can be resource intensive to set up and maintain.

BRIEF SUMMARY OF THE INVENTION

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

Figure 1:
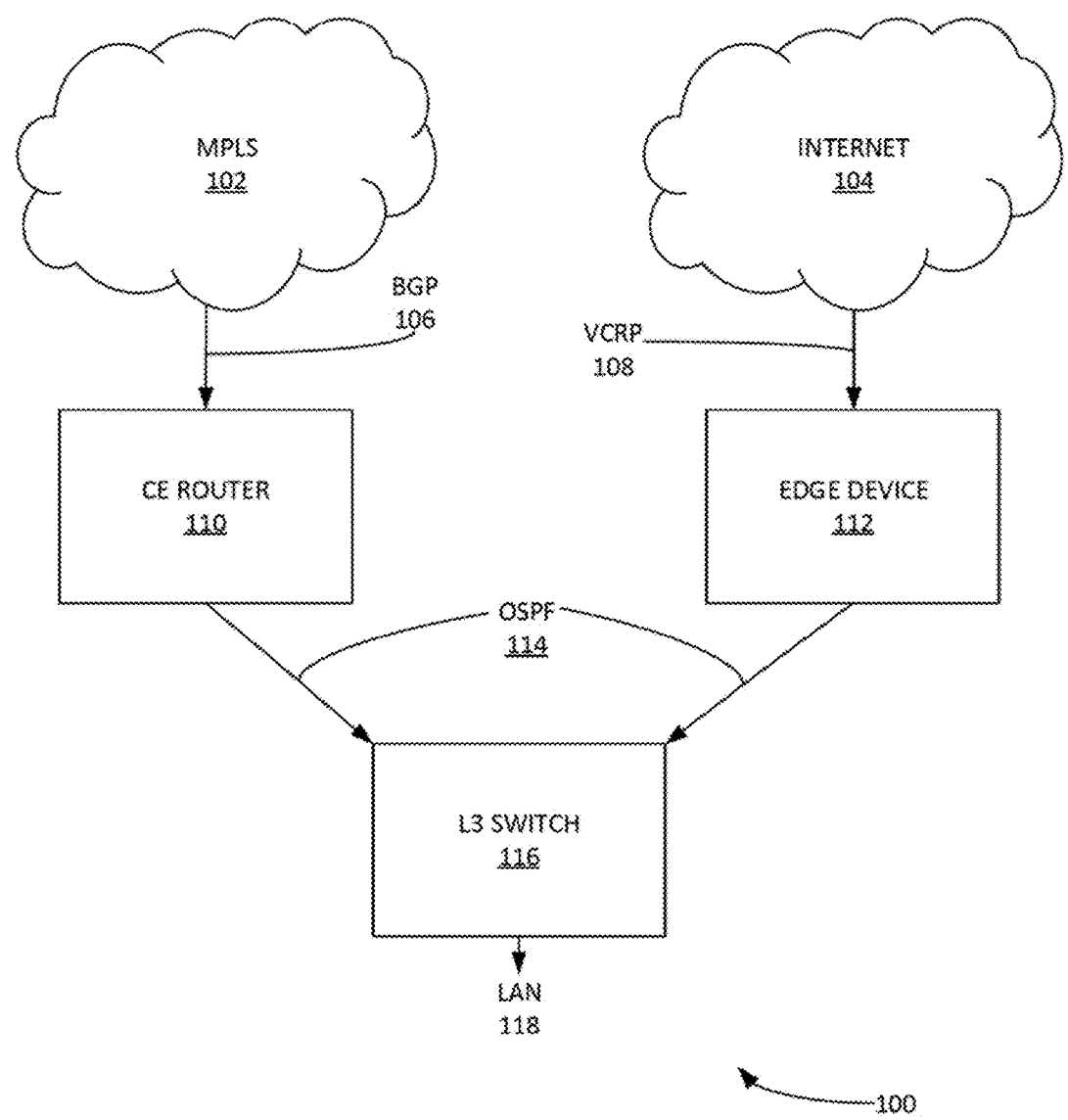
FIG. 1 illustrates an example network for implementing Overlay Flow Control, according to some embodiments.

The Figures described above are a representative set, and are not exhaustive with respect to embodying the invention.

DESCRIPTION

Disclosed are a system, method, and article of manufacture for overlay flow control. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

CE router (customer edge router) can be a router located on the customer premises that provides an Ethernet interface between the customer's LAN and the provider's core network. CE routers can be a component in an MPLS architecture.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Firewall can be a network security system that monitors and controls the incoming and outgoing network traffic based on predetermined security rules.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multi-Exit Discriminator (MED) can be an attribute of the Border Gateway Protocol used to influence route preference.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Open Shortest Path First (OSPF) can be a routing protocol for Internet Protocol (IP) networks. OSPF ca use a link state routing (LSR) algorithm and falls into the group of interior gateway protocols (IGPs), operating within a single autonomous system (AS).

Overlay Flow Control table can be a user interface on the Orchestrator which displays all routes in the customer and allows for editing routing attributes, preferred exits, and default behaviors for future learned routes.

Quality of Service (QoS) can include the ability to define a guaranteed set of actions such as routing, resource constraints (e.g. bandwidth, latency etc.).

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Examples Systems and Processes of Overlay Flow Control

In order to integrate into customer environments with minimal configuration required on existing devices, an Edge device and a gateway system can support dynamic routing protocols. In order to facilitate simplified use and management of these dynamic routing protocols such as OSPF. Accordingly, various Overlay Flow Control methods and system can be implemented. These can provide a user a single, simple point of configuration for all routes in a network without requiring changes to the protocol configuration itself.

FIG. 1 illustrates an example network 100 for implementing Overlay Flow Control, according to some embodiments. Network 100 provides an example topology with a single L3 switch 116 that is connected on the LAN 118 side of an edge device 112 (e.g. a Velocloud® edge device, etc.). L3 switch 116 can also be connected to a CE router 110. CE router 110 can redistribute an MPLS 102 and/or BGP 106 routes into OSPF 114 routes. In this topology, the edge device can learn routes from the L3 switch 116. Edge device 112 can inject its own routes as well. Network 100 can be communicatively coupled with the Internet 104 utilizing routing protocol 108 (e.g. Velocloud® routing protocol (VCRP), etc.). CE router 110 can be a customer-edge (CE) router. It is noted that in some examples, BGP can prefer routes with the shortest AS-path. The AS-path-prepend adds the AS number to the beginning of the AS path to make a shorter path appear longer and therefore less preferable.

Figure 2:
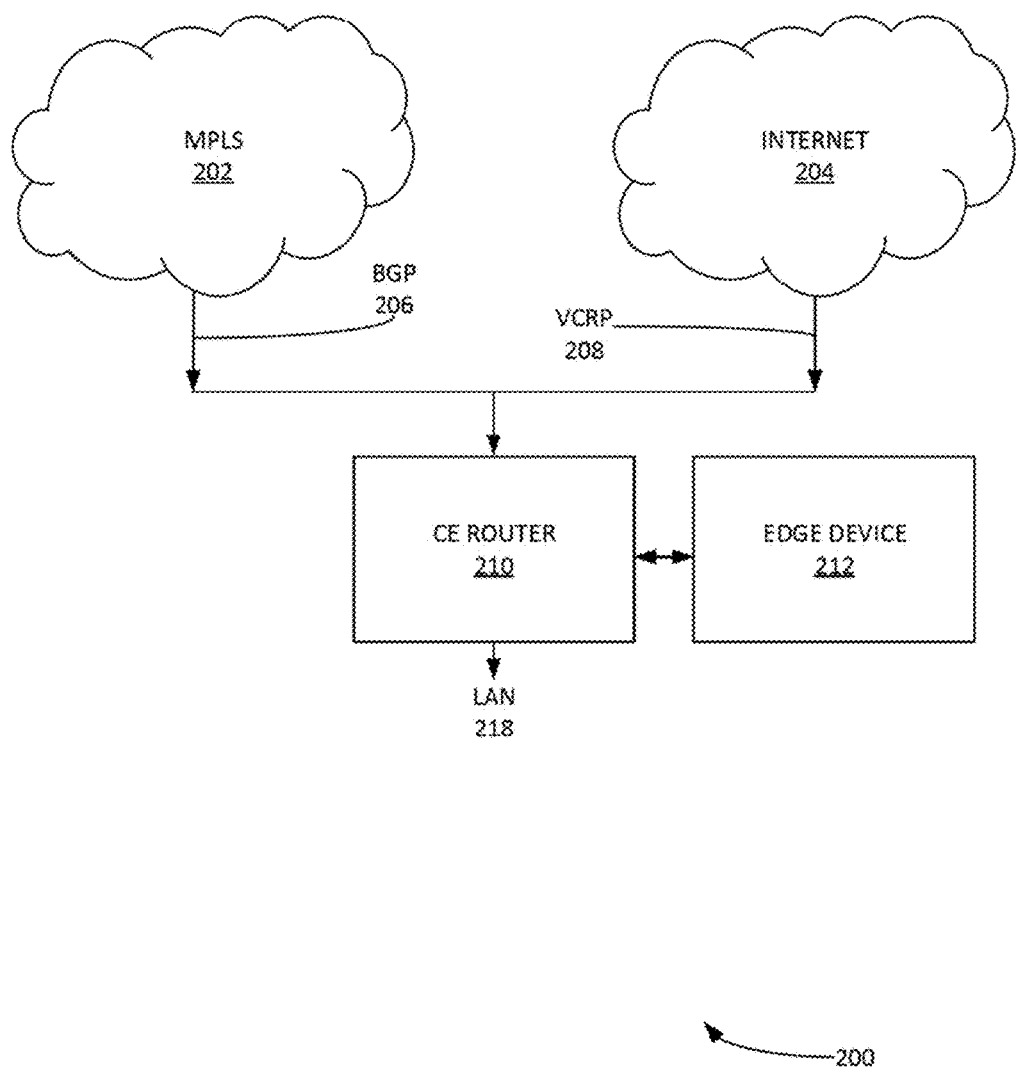
FIG. 2 illustrates another example network for implementing Overlay Flow Control, according to some embodiments.

FIG. 2 illustrates another example network 200 for implementing Overlay Flow Control, according to some embodiments. Network 100 provides an example topology where the Internet 204 and MPLS 202 links both terminate on a single router 210. Edge device 212 can be deployed in a 'one-arm' configuration attached to CE router 210. The edge device can redistribute an MPLS 102 and/or BGP 106 routes into OSPF 114 routes. In this topology, edge device 212 can learn routes from the L3 switch 116. In this example topology, edge device 212 can learn routes from the CE router 210, as well as injecting its own routes.

Figure 3:
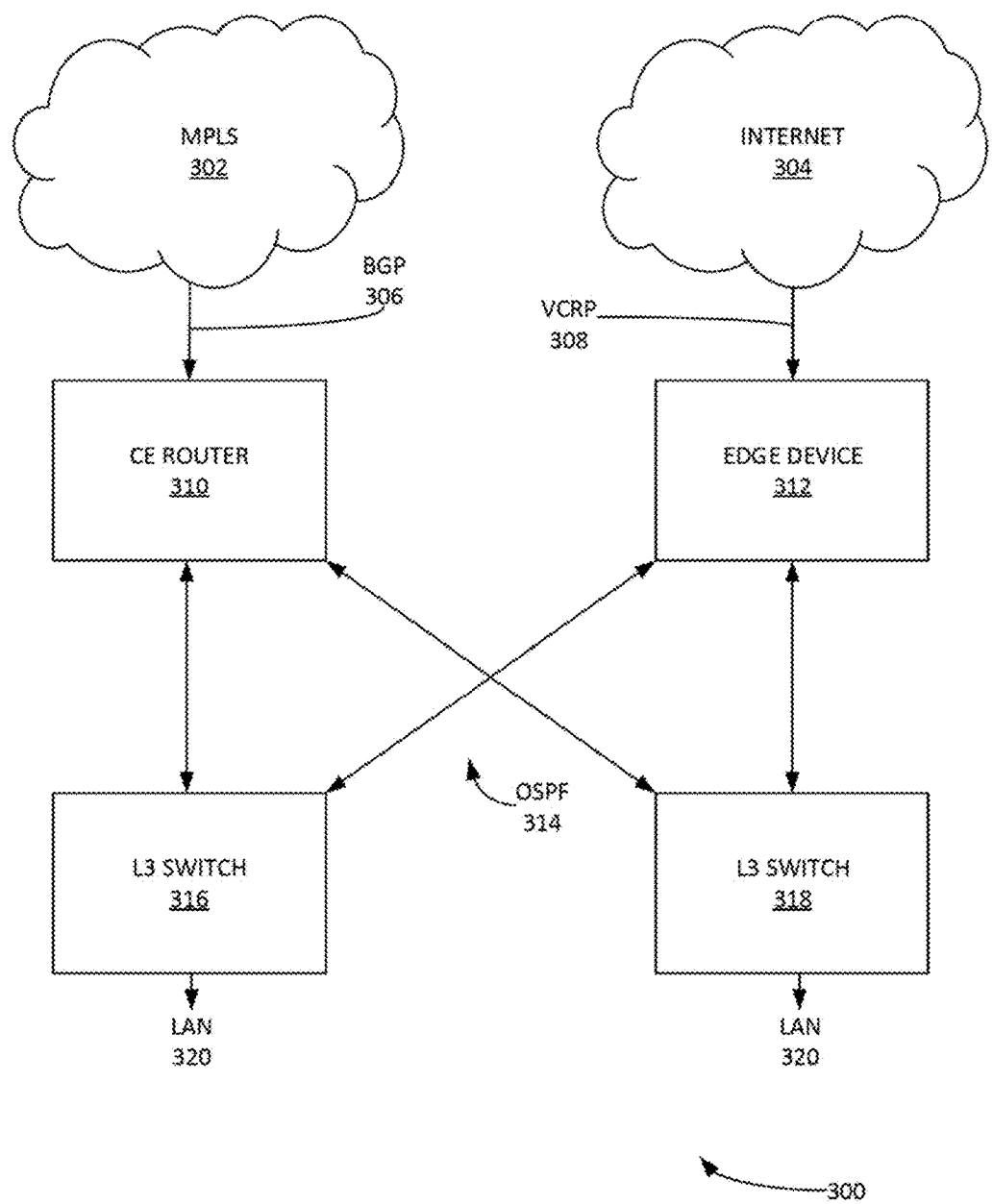
FIG. 3 illustrates another example network for implementing Overlay Flow Control, according to some embodiments.

FIG. 3 illustrates another example network 300 for implementing Overlay Flow Control, according to some embodiments. In an example large branch site, an active/active L3 switches 316-318 can communicate routes using OSPF 314 between two upstream devices (e.g. an Edge device) using OSPF 314 and a CE router 310. CE router 310 redistribute MPLS BGP routes 302, 306 into OSPF routes 314. It is noted that network 300 includes the notion of a single WAN link (e.g. MPLS) is accessible via two routed interfaces. In order to support this, a virtual IP address can be provisioned inside the edge and used in OSPF advertisement.

Figure 4:
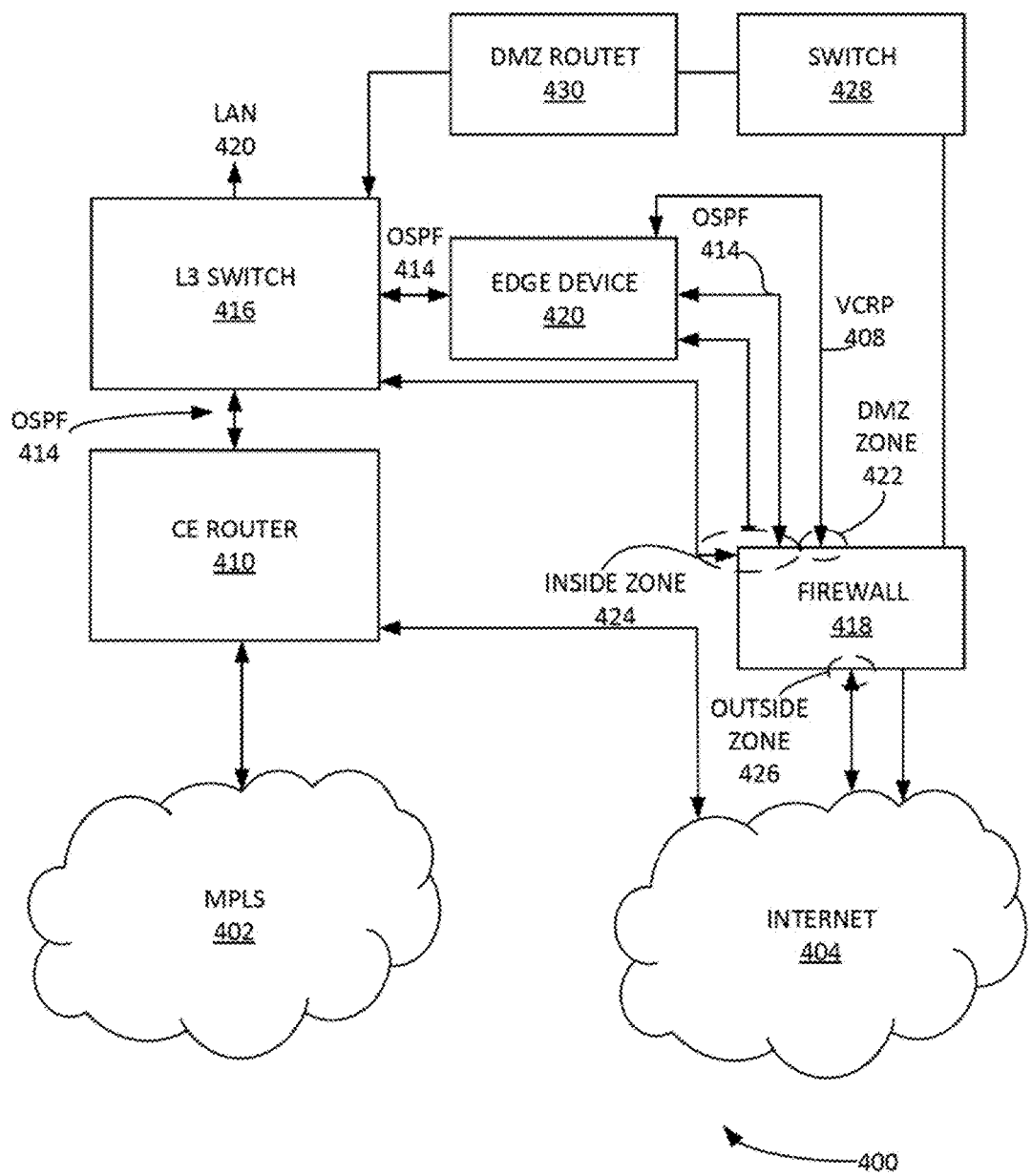
FIG. 4 illustrates another example network for implementing Overlay Flow Control, according to some embodiments.

FIG. 4 illustrates another example network 400 for implementing Overlay Flow Control, according to some embodiments. Network 400 can implement Overlay Flow Control in a datacenter site. A datacenter can have a distinct separation between the MPLS core and DMZ switch. The L3 switch can be talking OSPF and can be used for route learning and injection. The firewall within the DMZ can use routes injected via OSPF (though none may be learned) to ensure that returning Internet traffic is routed symmetrically.

Figure 5A:
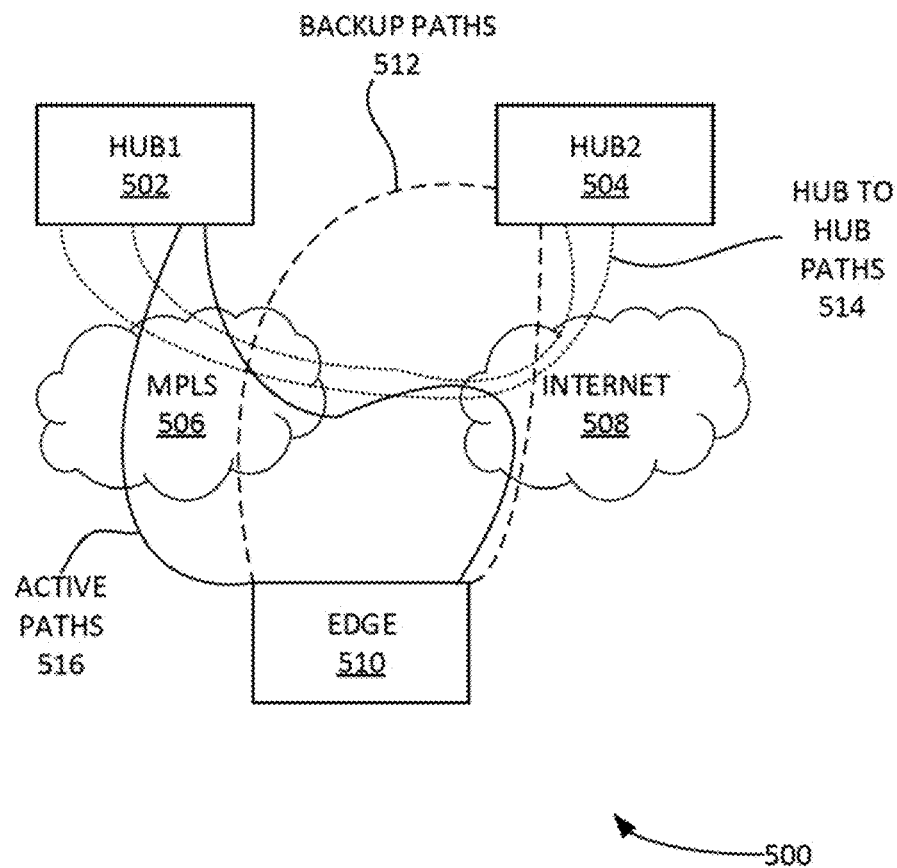
FIGS. 5 A-B illustrate an example topology of two data centers can be configured as edge-to-edge VPN hubs, according to some embodiments.
Figure 5B:
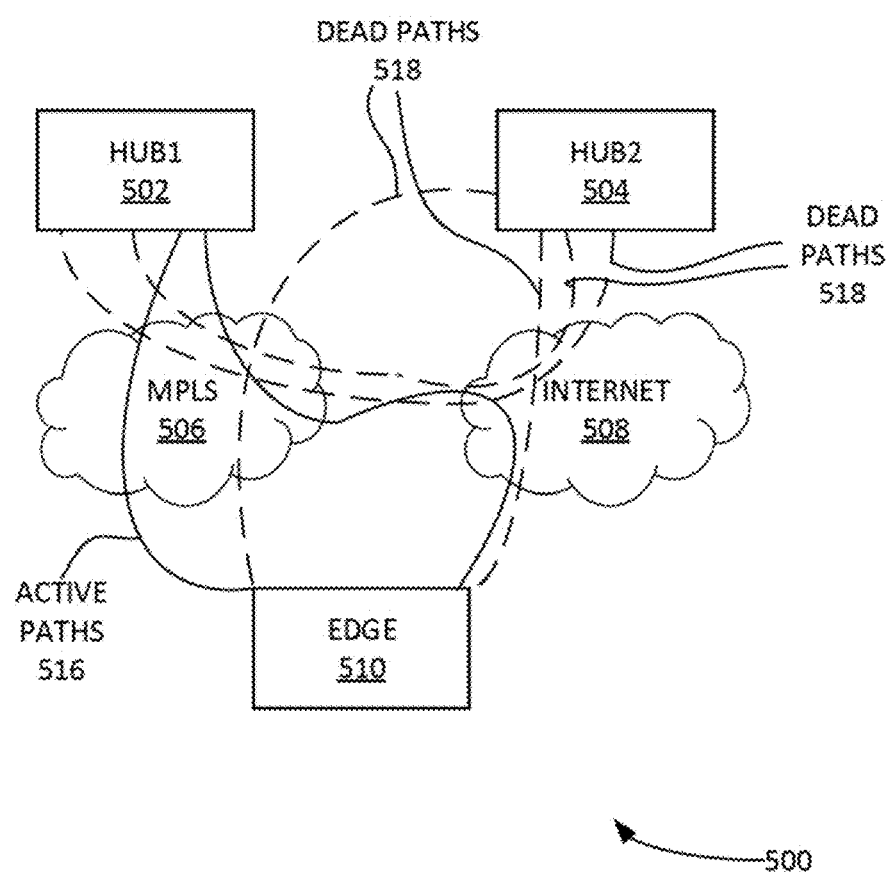

FIGS. 5 A-B illustrate an example topology 500 of two data centers can be configured as edge-to-edge VPN hubs, according to some embodiments. Example topology 500 can include redundant data centers which advertise the same subnets with different costs. In this scenario, both data centers (e.g. a primary datacenter and a backup datacenter, etc.) can be configured as edge-to-edge VPN hubs 502 and 504. As all edges connect directly to each hub 502 and 504 (e.g. via MPLS 506 and/or Internet 508) using paths 516, hubs 502 and 504 can also connect directly to each other using paths 514. Based on a route cost value, network traffic can be steered to the preferred active datacenter.

The customer can indicate whether routes are preferred (e.g. VeloCloud® Overlay becomes the default path with MPLS 506 as a backup) and/or non-preferred (e.g. where MPLS 506 remains the default path with VeloCloud® Overlay as a backup). The route costs for preferred, non-preferred and/or default routes can be configurable. For example, they can have different defaults based on whether OE1 or OE2 routes are used in the redistribution.

In one example, a CE Router can advertise an OE2 route. For routes with cost 'n' (where 'n>1'), it can be advertised with cost 'n−1'. For routes with cost '1', it can be advertised with cost '1' and a link cost 'm−1', where 'm' is the link cost from the L3 Switch/Router to the CE router.

In another example, CE Router advertises an OE1 route. Take the OE1 route cost as 'n'. The link cost can be obtained from the L3 Switch/Router to the CE router as 'm'. It can be advertised a route with cost 'n-prime' and link cost 'm-prime' such that ('n-prime'+'m-prime')<('n+m').

Figure 6A:
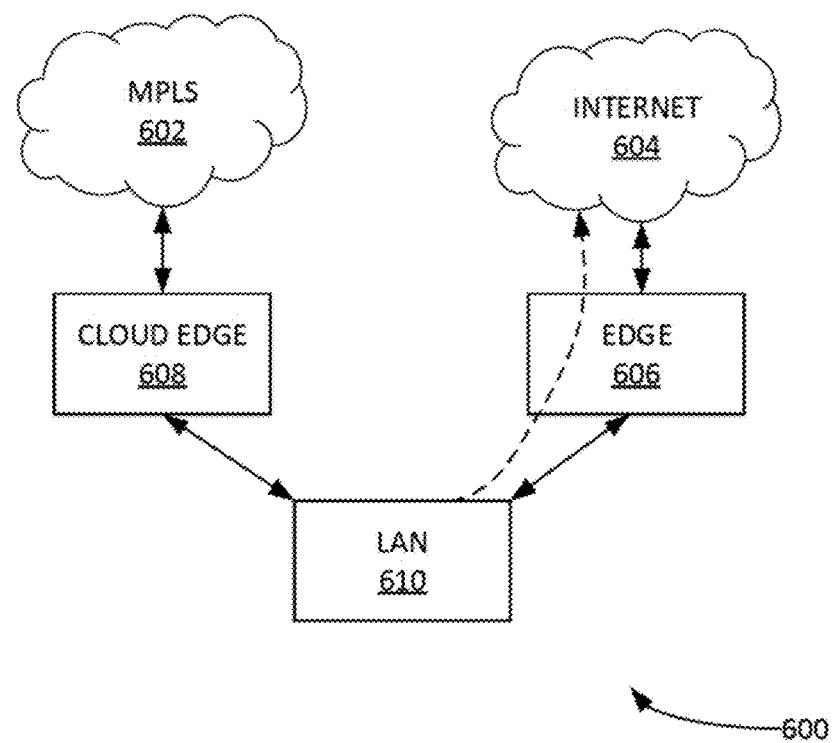
FIGS. 6 A-B illustrate example failover behaviors for preferred and non-preferred routes, according to some embodiments.
Figure 6B:
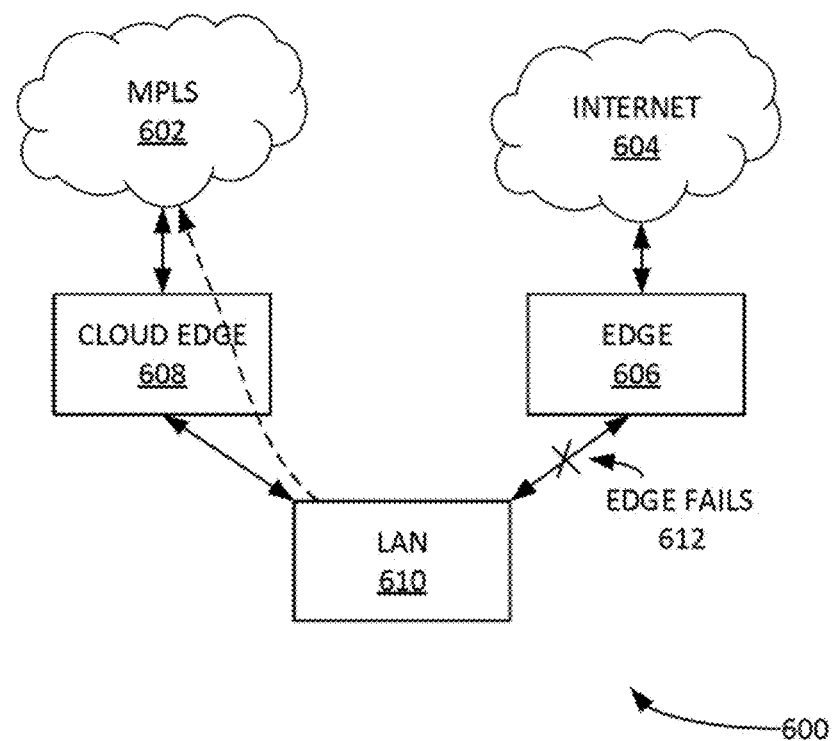
Figure 7A:
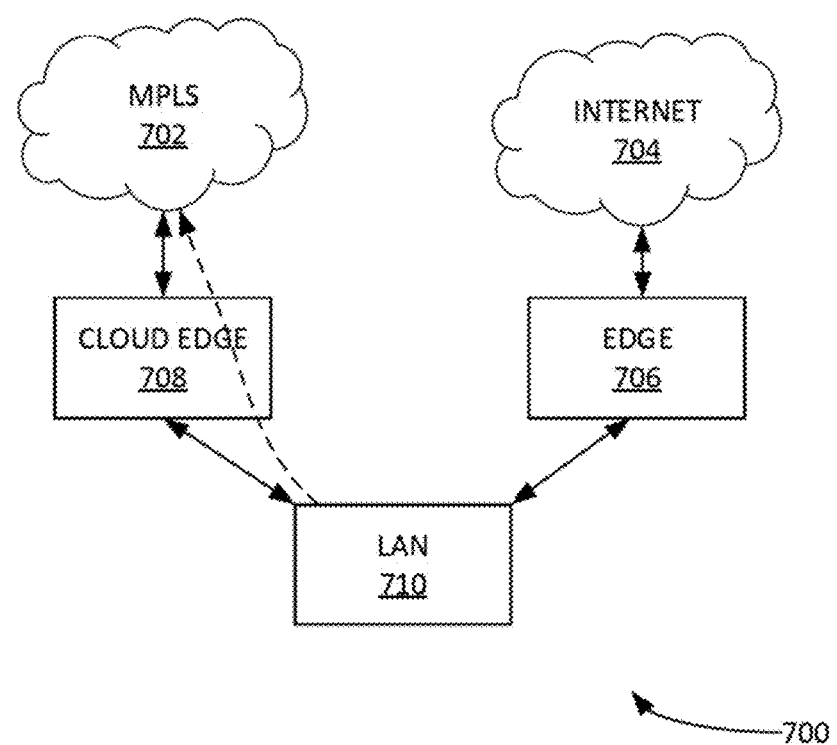
FIGS. 7 A-B illustrate example failover behaviors for preferred and non-preferred routes, according to some embodiments.
Figure 7B:
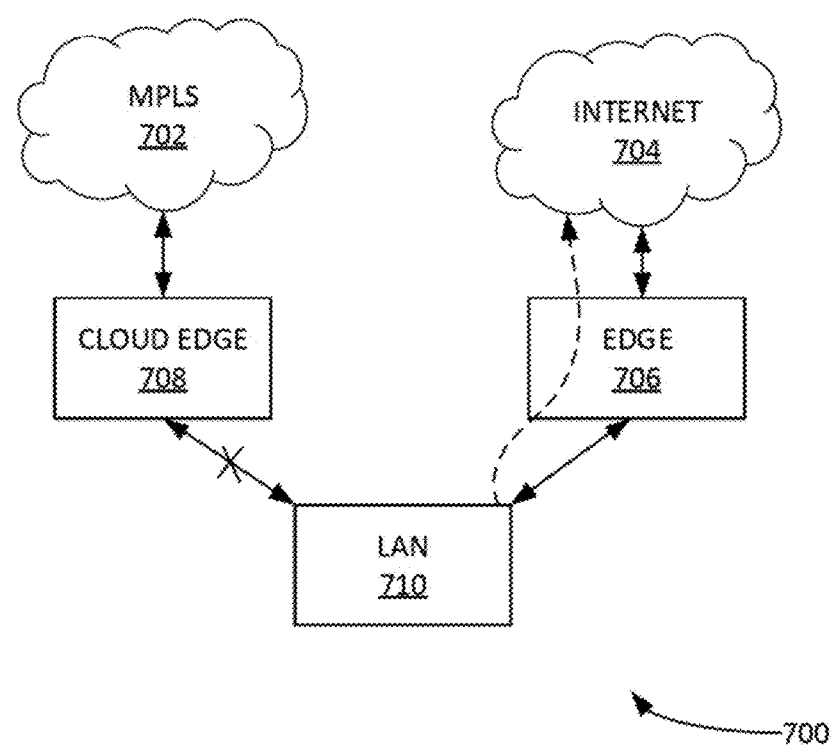

FIGS. 6 A-B illustrate example failover behaviors for preferred and non-preferred routes, according to some embodiments. FIGS. 7 A-B illustrate example failover behaviors for preferred and non-preferred routes, according to some embodiments.

It is noted that though route costs can be calculated for preferred and non-preferred routes (e.g. as provided supra), for simplicity they are presented below as 'n' for CE router cost, 'n−1' for a preferred route cost and 'n+1' for a non-preferred route cost.

Figure 9:
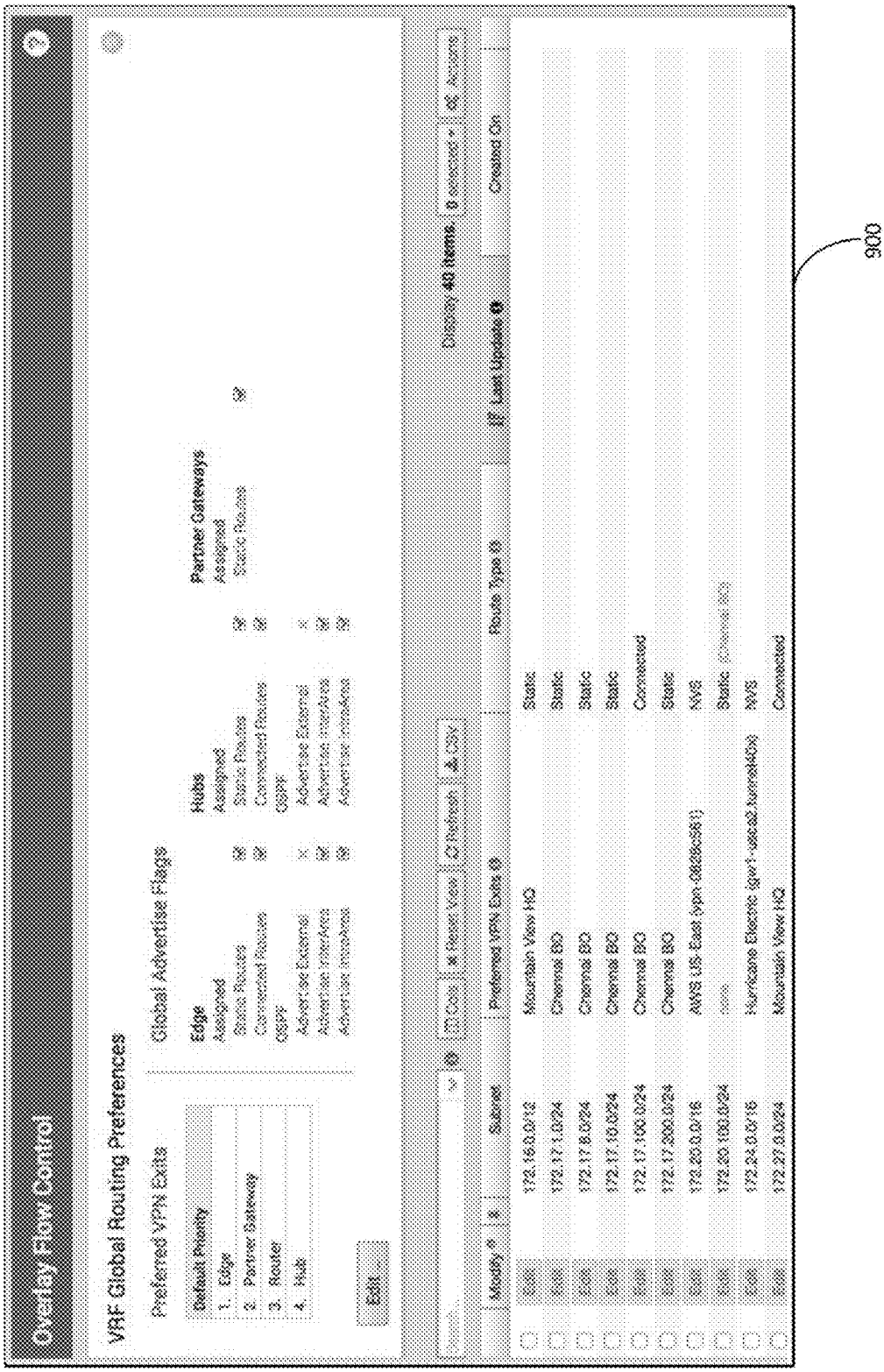
FIG. 9 illustrates an example screen shot of an Overlay Flow Control table, according to some embodiments.

To simplify the visualization and management of routes, they can be presented in an Overlay Flow Control table (e.g. see FIG. 9 infra). This table provides an enterprise-wide view of routes, routing adjacencies and preferred exits for each specific route. The preferred exit for any given route can be selected which can result in the routing preferences being automatically updated at each Edge device and advertised to influence routing changes across the network without the customer having to perform any further configuration actions. An edge device can implement the following rules for redistributing VCRP into OSPF. First, an edge device can redistribute VCRP prefixes that belong to various bronze sites as OE1, metric <m> if VCRP route preference is lower than DIRECT (if available) route preference. Else the prefixes are redistributed as OE2, metric <m> where m=low priority. A Direct route preference can be fixed to two-hundred and fifty-six (256). A VCRP route preference lower than 256 can indicate a route as a preferred route otherwise a Direct rout (if available) is preferred. The system can watch out for how CPE's redistribute this prefix into the MPLS cloud. The system can determine if the metric type is preserved by BGP attributes while redistributing into OSPF. The system can determine if the cost is preserved by BGP attributes while redistributing into OSPF.

Route insertion rules can be implemented. Routes can be inserted into a unified routing table based on the type of VPN profile configured. Hubs can setup direct routes for all VCRP prefixes. Branches can setup direct routes for prefixes via CG and/or VPN-hubs and/or DE2E direct route. For the same prefix, there can be two routes per transit point. This can be because the prefix is advertised by the owner and the hub. A first route can have a next_hop logical ID as transit point and destination logical ID as the owner. A next route can have a next hop logical ID and/or destination logical ID as VPN hub (e.g. not applicable for CG and DE2E).

A first example use case can include provisioning an edge device inside a datacenter location that previously did not contain one. In this example, Hub1 can be inserted into the Datacenter site as shown in the picture with a routed interface connected to L3 switch and the other WAN link connected to the Internet. The leg connecting L3 switch and Hub1 can have OSPF enabled. Hub1 can advertise default route 0.0.0.0/0 (originate-default) with metric 0 to L3 switch. This can allow Hub1 to take over Internet traffic sourced by subnets connected to L3 switch. Route H can have been learned as intra-area route (O). Route 'S' can have been learned as external type route (e.g. OEx). Route H and Route S can be added to OSPF view and are sent to VCO for GNDT sync up. Hub1 can be marked as owner of prefix 'H' and VCO responds to Hub1 with advertise flag set to True for prefix 'H'. Sites that advertise intra-area (O) or inter-area (IA) routes can be marked as owner of the routes in GNDT and can be allowed to advertise the routes to VCG. VCO can respond to Hub1 with advertise flag set to False for prefix 'S' as 'S' is an external-route and requires administrator's intervention. Hub1 can advertises route 'H' to VCG through VCRP.

In a second use-case example, a Bronze site can be brought online. It is noted that the as a prerequisite, the Datacenter are already be online. A Bronze1 site (e.g. a simple branch office site with only Internet connections and no MPLS or dynamic routing protocols such as OSPF in use at the site) can be provisioned and connected to VCG through an Internet link. Bronze1 site can advertise route 'B' to VCG through VCRP. VCG can be a reflector that reflects route 'B' to Hub1 with Bronze1 site as next hop and can reflect route 'H' to Bronze1 site with Hub1 site as next hop.

In a third use-case example, a Silver site (e.g. a branch office site containing a hybrid of MPLS and internet WAN links as well as an L3 device which is learning and advertising routes via OSPF) can be brought online. It is noted that the as a prerequisite, the Datacenter and associated Bronze site are already be online. Silver1 site can be stood up and connected to VCG through an Internet link. Silver1 site can learn routes 'H' and 'B' through VCG and install the learned sites into a unified route table. For example, Silver1 site can learn routes 'S' as an intra-area and routes 'H' and 'B' as external routes (e.g. from L3 switch). Routes 'S', 'H', and 'B' can be added to OSPF View and are communicated to VCO for GNDT synchronization. VCO responds with advertise flag set to 'True' for prefix 'S' but set to False for prefix 'H' and 'B'. Silver1 can advertise 'S' to other branches via VCG over VCRP.

In a fourth use-case example, a Legacy site route advertisement can be implemented. It is noted that the as a prerequisite, the Datacenter and associated Bronze and Silver sites are already online. Legacy site route 'L' can be learned by Hub1 site and Silver1 site as external route (e.g. OEx). Hub1 and Silver1 can communicate route 'L' to VCO for GNDT synchronization. Hub1 can be chosen as owner for the external route 'L'. (e.g. without administrator intervention). Hub1 can advertise route 'L' to other branches via VCG over VCRP. This can enable connectivity between legacy site 'L' and bronze1 site 'B'.

Various examples of hybrid sites distributing routes learned through VCRP into OSPF are now discussed. In a first example, a hybrid site on receiving route 'R' over VCRP can redistribute 'R' to L3 switch as external route based on various criteria. VeloCloude (B2B) can be set as preferred. Route 'R' can be revoked if it was installed with metric type OE2. Route 'R' can be redistributed with metric type OE1, metric 'M'=1; etc. Accordingly, the L3 switch can be programmed with route 'R' pointing to an edge device (e.g. a Velocloud® edge, etc.). Additionally, OE1 can provide the adjacent routers to add cost to route 'R' as the routes get redistributed further and thus may not impact the route priority for this route 'R' on other receiving sites. In one example, Silver1 can install route 'R' with metric 1, metric type OE1. This route 'R' can be installed as the high priority route on adjacent L3 router(s). However, when this route 'R' reaches another hybrid site. For example, Datacenter site can see that the route 'R' with metric >one (1). Accordingly, this does not affect the route 'R' on adjacent L3 routers of Datacenter site that can be pointing to Datacenter site as next hop.

A Direct criterion can be set as preferred when it is available. In one example, route 'R' can be revoked if it was installed with metric type OE1, metric 'M'=one (1). Route 'R' can be redistributed with metric type OE2, metric 'M'=cost of 'R'+<low_prio_offset>. <low_prio_offset> can be some value that installs the route as low priority route. The value can be updated based on lab experiment.

Hybrid site redistributing 'R' to L3 switch can enable connectivity between 'R' and 'B' over VeloCloud® B2B overlay. The VeloCloud® B2B Overlay is the VeloCloud® Edge and Gateway multipath system that was defined in the original patent providing multipath VPN connectivity between sites. Additionally, it allows connectivity between legacy sites 'L' and 'B' over private links and Velocloud B2B overlay.

Various examples of a gateway (e.g. a VeloCloud® Gateway, etc.) distributing routes learned through a routing protocol (e.g. VCRP) into BGP are now discussed. In a first example, a gateway receiving route 'R' over VCRP can redistribute 'R' to the adjacent L3 router(s) as a BGP route based on various criteria. Based on the gateway precedence, different gateway(s) can automatically redistribute with different priorities to influence steering of traffic to the preferred gateway. In one example, gateway 1 can redistribute route 'R' with MED 10 and gateway 2 can redistribute route 'R' with MED 20. In another example, a less preferred gateway 2 can send 'R' with automatic AS-path-prepend to effectively make gateway 1 preferred. In another example, the user may specify BGP communities in a priority-order (e.g. based on their mapping to local-preference on the provider-edge (PE) router side (e.g. a provider-edge router can be a version of a CE router that sits on the provider's edge instead of the customer's edge, etc.). Gateway 1 can then automatically redistribute route 'R' with a community value from this ordered list which is more preferred than the community value chosen on the route redistributed by gateway 2.

To facilitate ease of deployment of transit and non-transit edges (and/or to better categorize routes which are not local to an edge (e.g. routes learned from a separate autonomous system e.g. MPLS)), a new concept Uplink can be provided/implemented. A user may tag routes as Uplink for OFC driven preference/filtering purposes. In one example, user marks a BGP neighbor as Uplink and all routes learnt from this peer are tagged as Uplink (e.g. when replacing MPLS Customer Edge Router with a VeloCloud® Edge, etc.). In another example, the user can set a specific community value for routes not local to the Edge and configures that community value on the Edge BGP config as Uplink Community. Then any BGP learned route that has that community value, can be considered Uplink route. The OFC then provides global configuration options for Uplink routes that the user can use to easily control route propagation without manipulating routes individually.

Additional Exemplary Computer Architecture and Systems

Figure 8:
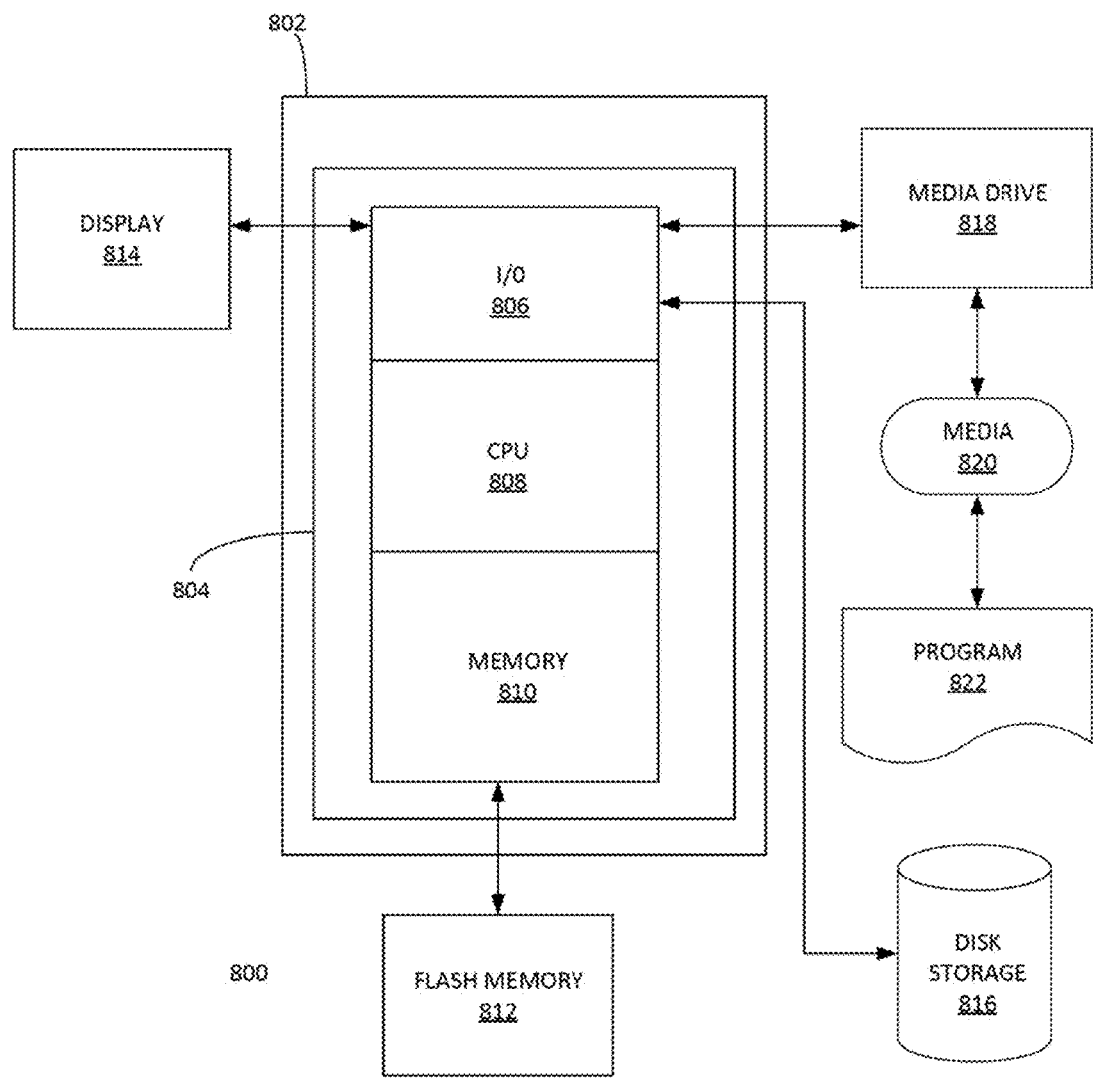
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

FIG. 9 illustrates an example screen shot 900 of an Overlay Flow Control table, according to some embodiments. Overlay Flow Control table can be a user interface on the Orchestrator. Screen shot 900 displays all routes in the customer system. Overlay Flow Control table allows for editing routing attributes, preferred exits, and default behaviors for future learned routes.

Figure 10:
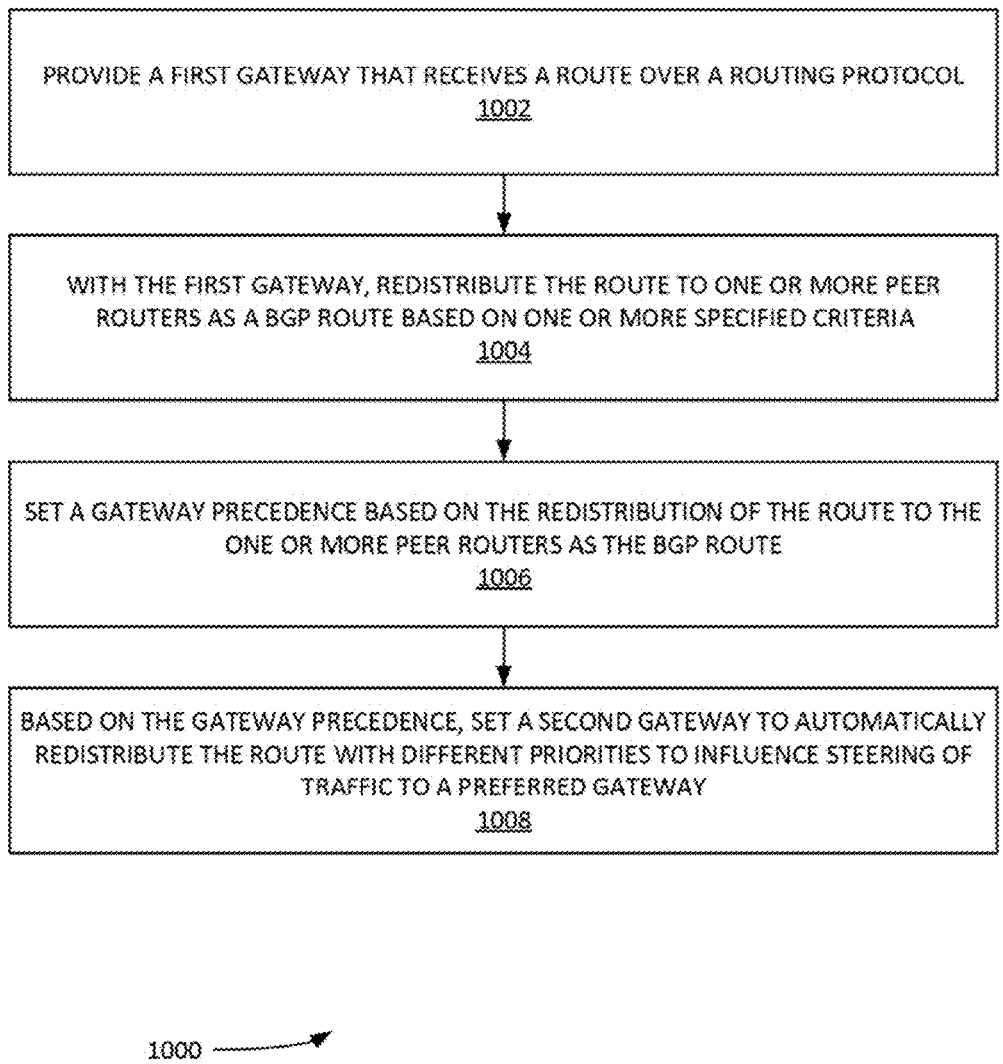
FIG. 10 illustrates an example process for overlay flow control, according to some embodiments.

FIG. 10 illustrates an example process 1000 for overlay flow control, according to some embodiments. In step 1002, process 1000 can provide a first gateway that receives a route over a routing protocol. In step 1004, process 1000 can, with the first gateway, redistribute the route to one or more peer routers as a BGP route based on one or more specified criteria. In step 1006, process 1000 can set a gateway precedence based on the redistribution of the route to the one or more peer routers as the BGP route. In step 1008, process 1000 can, based on the gateway precedence, set a second gateway to automatically redistribute the route with different priorities to influence steering of traffic to a preferred gateway. A peer router can be a router configured to be a peer to an edge router (e.g. a VeloCloud® edge, etc.) on a LAN. For example, a peer router can be an adjacent peer routers layer three (L3) router. It is noted that an edge device can be utilized in lieu of and/or as a gateway in some embodiments. For example, an edge device can redistribute the route as a BGP route or an OSPF (Open Shortest Path First) route.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for distributing routes by using a router precedence between a set of peer routers, the method comprising:
    at a first router of the set of peer routers that connect devices through an external network:
        receiving a route through a first routing protocol;
        to distribute the route through a second routing protocol to a set of one or more of the peer routers that comprises at least a peer, second router, selecting a high priority, first community value from a prioritized list of community values, said high priority, first community value establishing the first router as a preferred router in a router precedence for forwarding packets according to the route by ensuring that any peer router that receives the route through the first router and the second router uses the first router to forward packets according to the route; and
        distributing the route, with the high priority, first community value, through the second protocol to the set of peer routers;
        wherein the second router selects a lower priority, second community value from the prioritized list of community values whenever the second router distributes the route through the second protocol to another router.

2. The method of claim 1, wherein the lower priority, second community value establishes the second router as a less preferred router than the first router in the router precedence for forwarding packets according to the route.

3. The method of claim 1, wherein the second routing protocol is a Border Gateway Protocol (BGP) protocol and the second router distributes the route with an automatic autonomous systems (AS) path-prepend to further establish the first router as the preferred router in the router precedence.

4. The method of claim 1, wherein the second routing protocol is a Border Gateway Protocol (BGP) protocol and the prioritized list of community values comprises a user specified set of BGP communities in a priority-order.

5. The method of claim 4, wherein the user specified set of BGP communities is specified in a priority-order based on a mapping of the set of BGP communities to a Local-Preference on a provider side edge router.

6. The method of claim 4, wherein selecting the high priority, first community value comprises selecting a highest priority community value available in the priority-order and the second router selects the lower priority, second community value by selecting a next highest priority community value available in the priority-order.

7. The method of claim 1, wherein the first and second routers are gateway routers and the external network comprises a network of a public cloud provider.

8. The method of claim 1, wherein the external network further comprises the Internet.

9. A system for distributing routes by using a router precedence between a set of peer routers, the system comprising:
    a set of at least one processing unit on a first router in the set of peer routers that connect devices through an external network; and
    a non-transitory machine readable medium storing a program that when executed by the set of processing units comprises sets of instructions for:
        receiving a route through a first routing protocol;
        to distribute the route through a second routing protocol to a set of one or more of the peer routers that comprises at least a peer, second router, selecting a high priority, first community value from a prioritized list of community values, said high priority, first community value establishing the first router as a preferred router in a router precedence for forwarding packets according to the route by ensuring that any peer router that receives the route through the first router and the second router uses the first router to forward packets according to the route; and distributing the route, with the high priority, first community value, through the second protocol to the set of peer routers;

wherein the second router selects a lower priority, second community value from the prioritized list of community values whenever the second router distributes the route through the second protocol to another router.

10. The system of claim 9, wherein the lower priority, second community value establishes the second router as a less preferred router than the first router in the router precedence for forwarding packets according to the route.

11. The system of claim 9, wherein the second routing protocol is a Border Gateway Protocol (BGP) protocol and the second router distributes the route with an automatic autonomous systems (AS) path-prepend to further establish the first router as the preferred router in the router precedence.

12. The system of claim 9, wherein the second routing protocol is a Border Gateway Protocol (BGP) protocol and the prioritized list of community values comprises a user specified set of BGP communities in a priority-order.

13. The system of claim 12, wherein the user specified set of BGP communities is specified in a priority-order based on a mapping of the set of BGP communities to a Local-Preference on a provider side edge router.

14. The system of claim 12, wherein the sets of instructions for selecting the high priority, first community value comprises sets of instructions for selecting a highest priority community value available in the priority-order and the second router selects the lower priority, second community value by selecting a next highest priority community value available in the priority-order.

15. The system of claim 9, wherein the first and second routers are gateway routers and the external network comprises a network of a public cloud provider.

16. The system of claim 9, wherein the external network further comprises the Internet.

17. A method for distributing routes by using a Border Gateway Protocol (BGP) protocol and a router precedence between a set of peer routers, the method comprising:

at a first router of the set of peer routers that connect devices through an external network:

receiving, from a second router of the set of peer routers through the BGP protocol, a route with a high priority, first community value selected at the second router from a prioritized list of community values, said high priority, first community value establishing the second router as a preferred router in a router precedence for forwarding packets according to the route; and selecting, based on the router precedence, a lower priority, second community value from the prioritized list of community values for distributing with the route to ensure that any peer router that receives the route through the first router and the second router uses the second router to forward packets according to the route; and distributing the route with the lower priority, second community value through the BGP protocol to at least one other router.

18. The method of claim 17, wherein the lower priority, second community value establishes the first router as a less preferred router than the second router in the router precedence for forwarding packets according to the route.

19. The method of claim 17, wherein the prioritized list of community values comprises a user specified set of BGP communities in a priority-order based on a mapping of the set of BGP communities to a Local-Preference on a provider side edge router.

20. The method of claim 17, wherein selecting the high priority, first community value comprises selecting a highest priority community value available in the prioritized list of community values and the second router selects the lower priority, second community value by selecting a next highest priority community value available in the prioritized list of community values.

* * * * *